US012698353B2

(12) United States Patent
Park et al.

(10) Patent No.: US 12,698,353 B2
(45) Date of Patent: Aug. 4, 2026

(54) OLEFIN-BASED POLYMER

(71) Applicant: LG Chem, Ltd., Seoul (KR)

(72) Inventors: Sang Eun Park, Daejeon (KR); Ji Yoon Woo, Daejeon (KR); In Sung Park, Daejeon (KR); Choong Hoon Lee, Daejeon (KR); Ki Eun Kim, Daejeon (KR); Rae Keun Gwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 615 days.

(21) Appl. No.: 18/033,213

(22) PCT Filed: Mar. 23, 2022

(86) PCT No.: PCT/KR2022/004063
§ 371 (c)(1),
(2) Date: Apr. 21, 2023

(87) PCT Pub. No.: WO2022/203389
PCT Pub. Date: Sep. 29, 2022

(65) Prior Publication Data

US 2024/0026046 A1 Jan. 25, 2024

(30) Foreign Application Priority Data

Mar. 23, 2021 (KR) ........................ 10-2021-0037280

(51) Int. Cl.
*C08F 210/16* (2006.01)
*C08F 4/76* (2006.01)
*C08F 10/02* (2006.01)

(52) U.S. Cl.
CPC .............. *C08F 210/16* (2013.01); *C08F 4/76* (2013.01); *C08F 10/02* (2013.01); *C08F 2500/12* (2013.01); *C08F 2500/32* (2021.01); *C08F 2500/34* (2021.01); *C08F 2500/37* (2021.01)

(58) Field of Classification Search
CPC .. C08F 210/16; C08F 210/02; C08F 2500/37; C08F 2500/12; C08F 2500/34; C08F 2500/32; C08F 2500/08
See application file for complete search history.

(56) References Cited

U.S. PATENT DOCUMENTS

| | | | | |
|---|---|---|---|---|
| 7,829,641 | B2 | 11/2010 | Etherton et al. | |
| 11,339,235 | B2 * | 5/2022 | Park | C08F 210/16 |
| 11,518,870 | B2 * | 12/2022 | Lee | C08F 210/18 |
| 12,065,515 | B2 * | 8/2024 | Park | C08F 110/06 |
| 12,162,967 | B2 * | 12/2024 | Park | C08F 2/01 |
| 2003/0149180 | A1 | 8/2003 | Van Dun et al. | |
| 2004/0198911 | A1 | 10/2004 | Van Dun et al. | |
| 2007/0021567 | A1 | 1/2007 | Van Dun et al. | |
| 2008/0161497 | A1 | 7/2008 | Van Dun et al. | |
| 2010/0062927 | A1 | 3/2010 | Lee et al. | |
| 2010/0317798 | A1 | 12/2010 | VanDun et al. | |
| 2013/0085246 | A1 | 4/2013 | Kum et al. | |
| 2013/0096266 | A1 | 4/2013 | Van Dun et al. | |
| 2015/0045526 | A1 | 2/2015 | Kum et al. | |
| 2016/0347889 | A1 | 12/2016 | Lue et al. | |
| 2019/0119413 | A1 | 4/2019 | Holtcamp et al. | |
| 2019/0119417 | A1 | 4/2019 | Li et al. | |
| 2020/0362073 | A1 | 11/2020 | Park et al. | |
| 2022/0049030 | A1 | 2/2022 | Park et al. | |

FOREIGN PATENT DOCUMENTS

| | | | | |
|---|---|---|---|---|
| CN | 1543483 | A | 11/2004 | |
| CN | 1982361 | A | 6/2007 | |
| CN | 111278872 | A | 6/2020 | |
| CN | 111587256 | A | 8/2020 | |
| EP | 3699205 | A1 | 8/2020 | |
| JP | 2000168007 | A | 6/2000 | |
| JP | 4813239 | B2 | 11/2011 | |
| JP | 2013533351 | A | 8/2013 | |
| KR | 20070003071 | A | 1/2007 | |
| KR | 20080101542 | A | 11/2008 | |
| KR | 100976131 | B1 | 8/2010 | |
| KR | 101066969 | B1 | 9/2011 | |
| KR | 20160124788 | A | 10/2016 | |
| KR | 20200101700 | A | 8/2020 | |
| KR | 1020210038234 | A * | 4/2021 | C08F 2/04 |

OTHER PUBLICATIONS

Search report from International Application No. PCT/KR2022/004063, mailed Jul. 11, 2022.
Extended European Search Report including Written Opinion for Application No. 22776089.9 dated May 3, 2024, pp. 1-7.

* cited by examiner

*Primary Examiner* — Rip A Lee
(74) *Attorney, Agent, or Firm* — Lerner David LLP

(57) ABSTRACT

The present invention relates to an olefin-based polymer, particularly, to a low-density olefin-based polymer introducing a highly crystalline region and showing high mechanical rigidity.

13 Claims, No Drawings

OLEFIN-BASED POLYMER

CROSS-REFERENCE TO RELATED APPLICATIONS

The present application is a national stage entry under 35 U.S.C. § 371 of International Application No. PCT/KR2022/004063 filed on Mar. 23, 2022, which claims priority from Korean Patent Application No. 10-2021-0037280 filed on Mar. 23, 2021, all the disclosures of which are incorporated herein by reference.

TECHNICAL FIELD

The present invention relates to an olefin-based polymer.

BACKGROUND ART

Polyolefin has excellent moldability, heat resistance, mechanical properties, sanitary quality, permeability of water vapor and appearance characteristics of a molded article, and is widely used as an extrusion molded article, blow molded article and injection molded article. However, there are problems in that polyolefin, particularly, polyethylene has no polar group in a molecule, and has low compatibility with a polar resin such as nylon, and poor adhesiveness with a polar resin and a metal. As a result, it has been difficult to blend polyolefin with a polar resin and a metal or laminate with such materials for use. In addition, the molded article of polyolefin has defects of low surface hydrophilicity and antistatic properties.

In order to solve such problems and raise affinity with respect to polar materials, a method of grafting a monomer containing a polar group onto polyolefin through radical polymerization has been widely used. However, according to this method, crosslinking and molecular branch in the molecule of polyolefin may be cleaved during grafting reaction, and the viscosity balance between a graft polymer and a polar resin is not good, and miscibility therebetween is low. In addition, there are problems in that due to gel components produced in a molecule by crosslinking, or foreign materials produced by the cleavage of a molecular chain, the appearance characteristics of a molded article is poor.

In addition, as a method for preparing an olefin polymer such as an ethylene homopolymer, an ethylene/α-olefin copolymer, a propylene homopolymer and a propylene/α-olefin copolymer, a method of copolymerizing a polar monomer in the presence of a metal catalyst such as a titanium catalyst and a vanadium catalyst has been used. However, in case of copolymerizing a polar monomer using such a metal catalyst, there are problems of attaining wide molecular weight distribution or composition distribution and low polymerization activity.

In addition, as another method, a polymerization method in the presence of a metallocene catalyst formed using a transition metal compound such as zircononocene dichloride and an organoaluminum oxy compound (aluminoxane) is known. In case of using a metallocene catalyst, an olefin polymer with a high molecular weight is obtained in high activity, and the olefin polymer thus produced has narrow molecular weight distribution and narrow composition distribution.

In addition, as a method of preparing polyolefin containing a polar group, a method of using a metallocene catalyst using a metallocene compound having a ligand of a non-crosslinked cyclopentadienyl group, a crosslinked or non-crosslinked bis indenyl group, or an ethylene crosslinked unsubstituted indenyl group/fluorenyl group as a catalyst, is also known. However, this method has defects of very low polymerization activity. Accordingly, a method of protecting a polar group by a protecting group is performed, but in case of introducing a protecting group, this protecting group is required to be removed after reaction, resulting in a complicated process.

An ansa-metallocene compound is an organometal compound including two ligands connected by a bridge group, and due to the bridge group, the rotation of the ligands is prevented, and the activity and structure of a metal center is determined.

Such an ansa-metallocene compound is used as a catalyst for preparing an olefin-based homopolymer or copolymer. Particularly, it is known that an ansa-metallocene compound including a cyclopentadienyl-fluorenyl ligand may produce polyethylene having a high molecular weight, and through this, the microstructure of polypropylene may be controlled.

In addition, it is known that an ansa-metallocene compound including an indenyl ligand has excellent activity and may produce polyolefin having improved stereoregularity.

As described above, various studies on an ansa-metallocene compound capable of controlling the microstructure of an olefin-based polymer have been conducted, but the degrees are not yet enough.

PRIOR ART DOCUMENT

Patent Document (Patent Document 1) Korean Laid-open Patent No. 2007-0003071

DISCLOSURE OF THE INVENTION

Technical Problem

An object of the present invention is to provide a low-density olefin-based polymer introducing a highly crystalline region and showing high mechanical rigidity.

Technical Solution

To solve the above tasks, the present invention provides an olefin-based polymer satisfying conditions (1) to (4) below.

(1) A melt index (190° C., 2.16 kg load conditions) is from 0.1 to 10.0 g/10 min, (2) a density is from 0.875 to 0.895 g/cc, (3) an elution temperature (Te) measured by cross-fractionation chromatography (CFC) is from 30 to 40° C., and (4) $8.0 \leq P(75)-P(50) \leq 12.0$ is satisfied when measuring CFC, wherein P(75) and P(50) are an elution amount (wt %) in a temperature range of −20 to 75° C., and an elution amount (wt %) in a temperature range of −20 to 50° C., respectively, on a temperature-elution amount graph measured by CFC.

Advantageous Effects

The olefin-based polymer according to the present invention is a low-density olefin-based polymer, wherein a highly crystalline region is introduced, and high mechanical rigidity is shown.

BEST MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "polymer" used in the present disclosure means a polymer compound prepared by polymerizing monomers which are the same or different types. The common term "polymer" includes a term "interpolymer" as well as "homopolymer", "copolymer" and "terpolymer". In addition, the term "interpolymer" means a polymer prepared by polymerizing two or more different types of monomers. The common term "interpolymer" includes a term "copolymer" (commonly used to refer a polymer prepared from two different monomers) and a term "terpolymer" (commonly used to refer a polymer prepared from three different monomers). The term "interpolymer" includes a polymer prepared by polymerizing four or more types of monomers.

The olefin-based polymer according to the present invention satisfies conditions (1) to (5) below.

(1) A melt index (190° C., 2.16 kg load conditions) is from 0.1 to 10.0 g/10 min, (2) a density is from 0.875 to 0.895 g/cc, (3) an elution temperature (Te) measured by cross-fractionation chromatography (CFC) is from 30 to 40° C., and (4) $8.0 \leq P(75)-P(50) \leq 12.0$ is satisfied when measuring CFC, wherein P(75) and P(50) are an elution amount (wt %) in a temperature range of −20 to 75° C., and an elution amount (wt %) in a temperature range of −20 to 50° C., respectively, on a temperature-elution amount graph measured by CFC.

The olefin-based polymer according to the present invention has a low density and introduces a highly crystalline region when compared to a common conventional olefin-based polymer, and in case of having the same degrees of density and melt index (190° C., 2.16 kg load conditions), even higher tensile strength, flexural modulus and hardness may be shown. The olefin-based polymer according to the present invention is prepared by a preparation method including a step of polymerizing an olefin-based monomer by injecting a hydrogen gas in the presence of a catalyst composition for polymerizing olefin, and according to the injection of the hydrogen gas during polymerization, a highly crystalline region is introduced, and excellent mechanical rigidity is shown.

The olefin-based polymer satisfies the conditions (1) in that the melt index (190° C., 2.16 kg load conditions) is from 0.1 to 10.0 g/10 min.

The melt index (MI) may be controlled by controlling the amount used of a catalyst with respect to a comonomer in a process of polymerizing an olefin-based copolymer, and the melt index influences the mechanical properties, impact strength of the olefin-based copolymer, and moldability.

The melt index is measured in low-density conditions of 0.875 to 0.895 g/cc, under 190° C. and 2.16 kg load conditions according to ASTM D1238, and may be 0.1 to 10.0 g/10 min, particularly, 0.3 g/10 min or more, 0.4 g/10 min or more, and 9.0 g/10 min or less, 7.0 g/10 min or less.

The olefin-based polymer satisfies the conditions (2) in that the density is from 0.875 to 0.895 g/cc. Particularly, the density may be 0.876 g/cc or more, 0.878 g/cc or more, and 0.892 g/cc or less, 0.891 g/cc or less.

Generally, the density of an olefin-based polymer is influenced by the type and amount of a monomer used for polymerization, a polymerization degree, etc., and in case of a copolymer, the influence by the amount of a comonomer is significant. The olefin-based polymer of the present invention is polymerized using a catalyst composition including a transition metal compound having a characteristic structure, and a large amount of a comonomer may be introduced, thereby having a low density in a range as above-described.

The olefin-based polymer satisfies the conditions of (3) in that an elution temperature (Te) measured by cross-fractionation chromatography (CFC) is from 30 to 40° C. The elution temperature may particularly be 31° C. or more, 32° C. or more, and 40° C. or less, 39° C. or less.

The olefin-based polymer satisfies the conditions of (4) in that $8.0 \leq P(75)-P(50) \leq 12.0$ is satisfied when measuring CFC.

Here, P(75) and P(50) are an elution amount (wt %) in a temperature range of −20 to 75° C., and an elution amount (wt %) in a temperature range of −20 to 50° C., respectively, on a temperature-elution amount graph measured by CFC.

The meaning of the satisfaction of P(75) and P(50) in the range of the conditions (4) is that the olefin-based polymer has the high-crystalline content in the corresponding temperature ranges. The highly crystalline content of the olefin-based polymer of the present invention is high in contrast to a polymer having a similar elution temperature (Te), and cross-linked foaming efficiency may increase, and accordingly, a foam having excellent mechanical properties may be manufactured thereby.

If P(75) and P(50) deviates from the range of the conditions of (4), the mechanical properties of the olefin-based polymer may be deteriorated.

P(75) and P(50) satisfying the range of the conditions (4) may be achieved by injecting hydrogen in 20 to 100 cc/min during polymerizing ethylene and an alpha-olefin-based monomer in the present invention. Particularly, if hydrogen is injected in the aforementioned content, polymerization reaction may be terminated uniformly, molecular weight distribution and crystalline distribution may be controlled uniformly, and the range corresponding to the conditions (4) may be satisfied.

In addition, the olefin-based polymer satisfies the conditions of (5) in that a melt flow rate ratio (MFRR, $MI_{10}/MI_{2.16}$), which is a value ($MI_{10}/MI_{2.16}$) of a melt index ($MI_{10}$, 190° C., 10 kg load conditions) to a melt index ($MI_{2.16}$, 190° C., 2.15 kg load conditions), is from 5 to 10, and the melt flow rate ratio may particularly be 6 or more, and 9 or less, 8 or less.

The melt flow rate ratio may show a low value as in the conditions (5) according to the reduction of the number of long branched chain (LCB) of the olefin-based polymer, and the mechanical properties of the polymer may be improved.

In addition, the olefin-based polymer satisfies the conditions of (6) in that a melting temperature (Tm) measured by a differential scanning calorimetry (DSC) is from 55 to 90° C., and particularly, the melting temperature (Tm) may be 60° C. or more, 65° C. or more, and 80° C. or less, 75° C. or less. That is, 60° C.≤Tm≤80° C., more particularly, 65° C.≤Tm≤75° C. may be satisfied.

In addition, the olefin-based polymer additionally satisfies the conditions of (7) in that a glass transition temperature (Tg) measured by differential scanning calorimetry (DSC) is from −70 to −30° C., and particularly, the glass transition temperature (Tg) may be −60° C. or more, −51 or more, and −43° C. or less.

Generally, the measurement of a melting temperature (Tm) using differential scanning calorimetry (DSC) is performed by a first cycle including heating to a temperature higher by about 30° C. than the melting temperature (Tm) at a constant rate, and cooling to a temperature lower by about 30° C. than the glass transition temperature (Tg) at a constant rate, and a second cycle to obtain the peak of a standard melting temperature (Tm).

The differential scanning calorimetry precise measurement method (SSA) is known as a method of obtaining more accurate crystal information by undergoing a process of heating immediately before the peak of a melting temperature (Tm) and cooling after the first cycle using differential scanning calorimetry (DSC), and repeatedly performing heating to a temperature reduced by about 5° C. and cooling.

In case of introducing a small amount of a highly crystalline region to an olefin-based polymer, a high temperature melting peak may not be shown when measuring a melting temperature using general differential scanning calorimetry (DSC) but may be measured through the differential scanning calorimetry precise measurement method (SSA).

In addition, the olefin-based polymer according to an embodiment of the present invention may satisfy the conditions of (8) in that a weight average molecular weight (Mw) is from 10,000 to 500,000 g/mol, and particularly, the weight average molecular weight (Mw) may be 30,000 g/mol or more, 50,000 g/mol or more, and 300,000 g/mol or less, 200,000 g/mol or less.

The weight average molecular weight (Mw) is a polystyrene conversion molecular weight analyzed by gel permeation chromatography (GPC).

In addition, the olefin-based polymer according to an embodiment of the present invention may additionally satisfy the conditions of (9) in that molecular weight distribution (MWD) which is the ratio (Mw/Mn) of a weight average molecular weight (Mw) and a number average molecular weight (Mn), is from 0.1 to 6.0, and the molecular weight distribution (MWD) may particularly be 1.0 or more, 2.0 or more, and 4.0 or less, 3.0 or less.

In addition, the olefin-based polymer according to an embodiment of the present invention may additionally satisfy the conditions of (10) in that a soluble fraction (SF) at −20° C. when measuring cross-fractionation chromatography (CFC) is 2 wt % or less.

Particularly, the soluble fraction may be 2 wt % or less, 1 wt % or less.

When measuring the cross-fractionation chromatography (CFC), a fraction eluted at a low temperature has low crystallinity, and a soluble fraction (SF) eluted at −20° C. or less on the cross-fractionation chromatography (CFC) may be considered as an ultra-low crystalline region.

Generally, if the density of a polymer decreases, the crystallinity may decrease, the ultra-low crystalline region may increase, and impact strength may be improved. However, if the ultra-low crystalline region in a common olefin-based polymer is equal to or greater than a certain level, mechanical properties may be worsened. The olefin-based polymer according to the present invention has multiple crystal structures and relatively increased highly crystalline content by reducing the ultra-low crystalline content, thereby showing excellent mechanical properties such as improved tensile strength, tear strength and flexural modulus.

The olefin-based polymer may be any homopolymer selected from an olefin-based monomer, particularly, an alpha-olefin-based monomer, a cyclic olefin-based monomer, a diene olefin-based monomer, a triene olefin-based monomer and a styrene-based monomer, or a copolymer of two or more. More particularly, the olefin-based polymer may be a copolymer of ethylene with alpha-olefin of 3 to 12 carbon atoms, or a copolymer with alpha-olefin of 3 to 10 carbon atoms.

The alpha-olefin comonomer may include any one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, vinyl norbornene, 1,4-butadiene, 1,5-pentadiene, 1,6-hexadiene, styrene, alpha-methylstyrene, divinylbenzene and 3-chloromethylstyrene, or mixtures of two or more thereof.

More particularly, the olefin-based copolymer according to an embodiment of the present invention may be a copolymer of ethylene with propylene, ethylene with 1-butene, ethylene with 1-hexene, ethylene with 4-methyl-1-pentene or ethylene with 1-octene, and more particularly, the olefin copolymer according to an embodiment of the present invention may be a copolymer of ethylene with 1-butene.

If the olefin-based polymer is the copolymer of ethylene and alpha-olefin, the amount of the alpha-olefin may be 90 wt % or less, more particularly, 70 wt % or less, further more particularly, 5 wt % to 60 wt %, further more particularly, wt % to 50 wt % based on the total weight of the copolymer. If the alpha-olefin is included in the range, the achievement of the above-described physical properties may be easy.

The olefin-based polymer according to an embodiment of the present invention having the above-described physical properties and configurational characteristics may be prepared through continuous solution polymerization reaction for polymerizing an olefin-based monomer by injecting a hydrogen gas in the presence of a metallocene catalyst composition including one or more types of transition metal compounds in a single reactor. Accordingly, in the olefin-based polymer according to an embodiment of the present invention, a block composed by linearly connecting two or more repeating units derived from any one monomer among monomers constituting a polymer, is not formed in the polymer. That is, the olefin-based polymer according to the present invention may not include a block copolymer, but may be selected from the group consisting of a random copolymer, an alternating copolymer and a graft copolymer, more particularly, a random copolymer.

Particularly, the olefin-based copolymer of the present invention may be obtained by a preparation method including a step of polymerizing an olefin-based monomer by injecting a hydrogen gas at 20 to 100 cc/min in the presence of a catalyst composition for polymerizing olefin, including a transition metal compound of Formula 1 below, for example, by continuous solution polymerization reaction using a continuous stirred tank reactor by injecting hydrogen in the presence of a catalyst composition for polymerizing olefin, including a transition metal compound of Formula 1 below.

However, in the preparation of the olefin-based polymer according to an embodiment of the present invention, it should be understood that the range of the structure of the transition metal compound of Formula 1 is not limited to a specific disclosed type, but all changes, equivalents or substituents included in the spirit and technical range of the present invention are included.

[Formula 1]

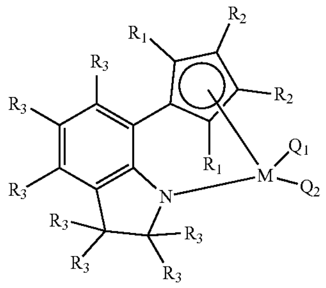

In Formula 1, $R_1$ groups are the same or different and each independently hydrogen, alkyl of 1 to 20 carbon atoms, alkenyl of 2 to 20 carbon atoms, aryl, silyl, alkylaryl, arylalkyl, or metalloid radical of a metal in group 4, which is substituted with hydrocarbyl, and two $R_1$ groups may be connected with each other by alkylidene radical containing alkyl of 1 to 20 carbon atoms or aryl radical of 6 to 20 carbon atoms to form a ring;

$R_2$ groups are the same or different and each independently hydrogen; halogen; alkyl of 1 to 20 carbon atoms; aryl; alkoxy; aryl oxy; or amido radical, and two or more among $R_2$ groups may be connected with each other to form an aliphatic ring or an aromatic ring;

$R_3$ groups are the same or different and each independently hydrogen; halogen; alkyl of 1 to 20 carbon atoms; or a nitrogen-containing aliphatic or aromatic ring, which is substituted or unsubstituted with aryl radical, in case where multiple substituents are present, two or more substituents among the substituents may be connected with each other to form an aliphatic or aromatic ring;

M is a transition metal in group 4; and $Q_1$ and $Q_2$ are each independently halogen; alkyl of 1 to 20 carbon atoms; alkenyl; aryl; alkylaryl; arylalkyl; alkyl amido of 1 to 20 carbon atoms; aryl amido; or alkylidene radical of 1 to 20 carbon atoms.

In addition, in another embodiment of the present invention, in Formula 1, $R_1$ and $R_2$ may be the same or different and each independently hydrogen; alkyl of 1 to 20 carbon atoms; aryl; or silyl, $R_3$ groups may be the same or different and may be alkyl of 1 to 20 carbon atoms; alkenyl of 2 to 20 carbon atoms; aryl; alkylaryl; arylalkyl; alkoxy of 1 to 20 carbon atoms; aryloxy; or amido, and two or more $R_3$ groups among RE may be connected with each other to form an aliphatic or aromatic ring;

$Q_1$ and $Q_2$ may be the same or different and each independently halogen; alkyl of 1 to 20 carbon atoms; alkyl amido of 1 to 20 carbon atoms; or aryl amido, and M may be a transition metal in group 4.

The transition metal compound represented by Formula 1 has characteristics in which a metal site is connected by a cyclopentadienyl ligand introducing tetrahydroquinoline, and a narrow Cp-M-N angle and a wide $Q_1$-M-$Q_2$ ($Q_3$-M-$Q_4$) angle to which a monomer goes near, are maintained. In addition, according to the bonding of a ring type, Cp, tetrahydroquinoline, nitrogen and a metal site are connected in order, and more stable and rigid five-member ring structure is formed. Accordingly, in case of activating such compounds by reacting with a co-catalyst such as methylaluminoxane and $B(C_6F_5)_3$ and then, applying thereof to olefin polymerization, the polymerization of an olefin-based polymer having the characteristics of high activity, high molecular weight and high copolymerization properties may be achieved even at a high polymerization temperature.

The injection amount of the hydrogen gas injected in the step of polymerizing an olefin-based monomer may be 20 to sccm, particularly, 22 to 38 sccm, more particularly, 22 to sccm. The injection amount of the hydrogen gas is an amount based on a case where ethylene is injected in an amount of kg/h to a reaction system. If the injection amount of the hydrogen gas satisfies the range in the presence of the catalyst composition for polymerizing olefin, including the transition metal compound of Formula 1, an olefin-based polymer satisfying the range conditions of the physical properties of the olefin-based polymer according to an embodiment of the present invention, may be prepared.

Each substituent defined in the present disclosure will be explained in detail as follows.

The term "hydrocarbyl group" used in the present disclosure means a monovalent hydrocarbon group of 1 to 20 carbon atoms, which is composed of only carbon and hydrogen irrespective of its structure, such as alkyl, aryl, alkenyl, alkynyl, cycloalkyl, alkylaryl and arylalkyl, unless otherwise referred to.

The term "halogen" used in the present disclosure means fluorine, chlorine, bromine or iodine, unless otherwise referred to.

The term "alkyl" used in the present disclosure means a hydrocarbon residual group of a linear chain or branched chain, unless otherwise referred to.

The term "cycloalkyl" used in the present disclosure represents cyclic alkyl including cyclopropyl, etc., unless otherwise referred to.

The term "alkenyl" used in the present disclosure means an alkenyl group of a linear chain or branched chain, unless otherwise referred to.

The branched chain may be alkyl of 1 to 20 carbon atoms; alkenyl of 2 to 20 carbon atoms; aryl of 6 to 20 carbon atoms; alkylaryl of 7 to 20 carbon atoms; or arylalkyl of 7 to 20 carbon atoms.

The term "aryl" used in the present invention represents, unless otherwise referred to, an aromatic group of 6 to 20 carbon atoms, particularly, phenyl, naphthyl, anthryl, phenanthryl, chrysenyl, pyrenyl, anthracenyl, dimethylanilinyl, anisolyl, etc., without limitation.

The alkylaryl group means an aryl group substituted with the alkyl group.

The arylalkyl group means an alkyl group substituted with the aryl group.

The cyclic group (or heterocyclic group) means a monovalent aliphatic or aromatic hydrocarbon group having 5 to ring-forming carbon atoms and including one or more heteroatoms, and may be a single ring or a condensed ring of two or more rings. In addition, the heterocyclic group may be substituted or unsubstituted with an alkyl group. Examples thereof may include indoline, tetrahydroquinoline, etc., but the present invention is not limited thereto.

The alkyl amino group means an amino group substituted with the alkyl group, and includes a dimethylamino group, a diethylamino group, etc., without limitation.

According to an embodiment of the present invention, the aryl group may preferably have 6 to 20 carbon atoms, and may particularly be phenyl, naphthyl, anthracenyl, dimethylanilinyl, anisolyl, etc., without limitation.

In the present disclosure, the silyl may be silyl substituted or unsubstituted with alkyl of 1 to 20 carbo atoms, for example, silyl, trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, etc., without limitation.

The compound of Formula 1 may be Formula 1-1 below, without limitation.

[Formula 1-1]

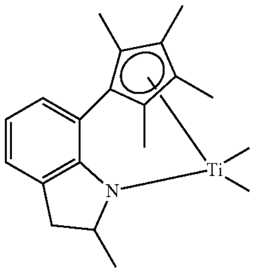

Besides, the compound may have various structures within the range defined in Formula 1.

The transition metal compound of Formula 1 may introduce a large amount of alpha-olefin as well as low-density polyethylene due to the structural characteristics of a catalyst, and a low-density polyolefin copolymer with a degree of 0.850 g/cc to 0.890 g/cc may be prepared.

The transition metal compound of Formula 1 may be prepared by, for example, a method below.

[Reaction 1]

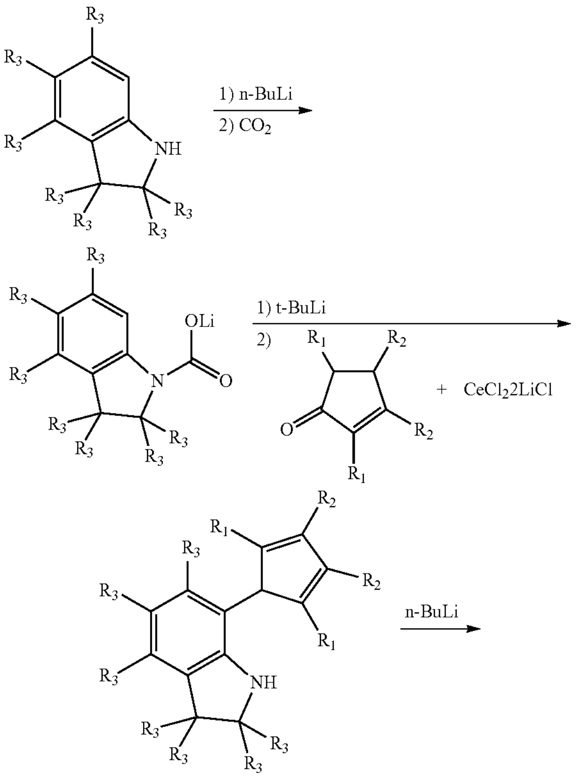

-continued

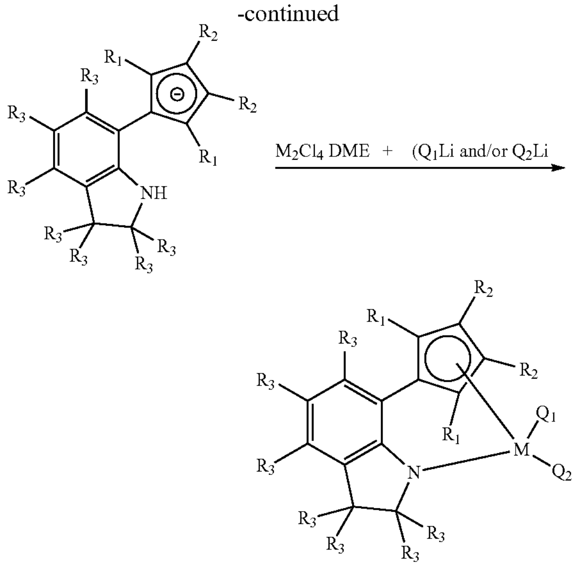

In Reaction 1, $R_1$ to $R_3$, M, $Q_1$ and $Q_2$ are the same as defined in Formula 1.

Formula 1 may be prepared by a method disclosed in Patent Laid-open No. 2007-0003071, and all contents of the patent document are included in the present disclosure.

The transition metal compound of Formula 1 may be used as a catalyst of polymerization reaction as a composition type additionally including one or more among the co-catalyst compounds represented by Formula 2, Formula 3, and Formula 4 below.

[Formula 2]

$$-[Al(R_4)-O]_a-$$

[Formula 3]

$$A(R_4)_3$$

[Formula 4]

$$[L-H]^+[W(D)_4]^- \text{ or } [L]^+[W(D)_4]^-$$

In Formulae 2 to 4, $R_4$ groups may be the same or different from each other and each independently selected from the group consisting of halogen, hydrocarbyl of 1 to 20 carbon atoms, and halogen-substituted hydrocarbyl of 1 to 20 carbon atoms, A is aluminum or boron, D groups are each independently aryl of 6 to 20 carbon atoms or alkyl of 1 to 20 carbon atoms, of which one or more hydrogen atoms may be substituted with substituents, wherein the substituent is at least any one selected from the group consisting of halogen, hydrocarbyl of 1 to 20 carbon atoms, alkoxy of 1 to 20 carbon atoms and aryloxy of 6 to 20 carbon atoms, H is a hydrogen atom, L is a neutral or cationic Lewis acid, W is an element in group 13, and a is an integer of 2 or more.

Examples of the compound represented by Formula 2 may include alkylaluminoxane such as methylaluminoxane (MAO), ethylaluminoxane, isobutylaluminoxane and butylalminoxane, and a modified alkylaluminoxane obtained by mixing two or more types of the alkylaluminoxane, particularly, methylaluminoxane, modified methylaluminoxane (MAO).

Examples of the compound represented by Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. and particularly, may be selected from trimethylaluminum, triethylaluminum and triisobutylaluminum.

Examples of the compound represented by Formula 4 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, dimethylanilium tetrakis(pentafluorophenyl) borate, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl) aluminum, tributylammoniumtetra(p-trifluoromethylphenyl)aluminum, trimethylammoniumtetra (p-trifluoromethylphenyl)aluminum, tributylammoniumtetrapentafluorophenylaluminum, N,N-diethylaniliniumtetraphenylaluminum, N,N-diethylaniliumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, triphenylcarboniumtetra(p-trifluoromethylphenyl) boron, or triphenylcarboniumtetrapentafluorophenylboron.

The catalyst composition may be prepared by, as a first method, a preparation method including 1) a step of obtaining a mixture by contacting the transition metal compound represented by Formula 1 with the compound represented by Formula 2 or Formula 3; and 2) a step of adding the compound represented by Formula 4 to the mixture.

In addition, the catalyst composition may be prepared by, as a second method, a method of making contacting of the transition metal compound represented by Formula 1 with the compound represented by Formula 4.

In the first method in the preparation method of the catalyst composition, the molar ratio of the transition metal compound represented by Formula 1 and the compound represented by Formula 2/the compound represented by Formula 3 may be 1/5,000 to 1/2, particularly, 1/1,000 to 1/10, more particularly, 1/500 to 1/20. If the molar ratio of the transition metal compound represented by Formula 1/the compound represented by Formula 2 or Formula 3 is greater than 1/2, the amount of an alkylating agent is too small, and the alkylation of a metal compound may be incompletely carried out, and if the molar ratio is less than 1/5,000, the alkylation of the metal compound may be achieved, but the activation of the alkylated metal compound may be incompletely carried out due to the side reactions between an excessive amount of the alkylating agent remained and an activating agent which is the compound of Formula 4. In addition, the molar ratio of the transition metal compound represented by Formula 1/the compound represented by Formula 4 may be 1/25 to 1, particularly, 1/10 to 1, more particularly, 1/5 to 1. If the molar ratio of the transition metal compound represented by Formula 1/the compound represented by Formula 4 is greater than 1, the amount of an activating agent is relatively small, and the activation of the metal compound may be incompletely carried out, and thus, the activity of the catalyst composition may be deteriorated. If the molar ratio is less than 1/25, the activation of the metal compound may be completely carried out, but due to the excessive amount of the activating agent remained, it would not be economical considering the unit cost of the catalyst composition, or the purity of a polymer produced may be degraded.

In the second method in the preparation method of the catalyst composition, the molar ratio of the transition metal compound represented by Formula 1/the compound represented by Formula 4 may be 1/10,000 to 1:10, particularly, 1/5,000 to 1:100, more particularly, 1/3,000 to 1/500. If the molar ratio is greater than 1/10, the amount of an activating agent is relatively small, and the activation of the metal compound may be incompletely carried out, and the activity of the catalyst composition thus produced may be degraded. If the molar ratio is less than 1/10,000, the activation of the metal compound may be completely carried out, but due to the excessive amount of the activating agent remained, it would not be economical considering the unit cost of the catalyst composition, or the purity of a polymer produced may be degraded.

As the reaction solvent during preparing the catalyst composition, a hydrocarbon-based solvent such as pentane, hexane, and heptane, or an aromatic solvent such as benzene and toluene may be used.

In addition, the catalyst composition may include the transition metal compound and the co-catalyst compound in a supported type on a support.

Any supports used in a metallocene-based catalyst may be used as the support without specific limitation. Particularly, the support may be silica, silica-alumina or silica-magnesia, and any one among them or mixtures of two or more thereof may be used.

In case where the support is silica among them, since a silica support and the functional group of the metallocene compound of Formula 1 may form a chemical bond, there is no catalyst separated from the surface during an olefin polymerization process. As a result, the generation of fouling, by which polymer particles are agglomerated on the wall side of a reactor or from each other during the preparation process of an olefin-based copolymer, may be prevented. In addition, the particle shape and apparent density of a polymer of the olefin-based copolymer prepared in the presence of a catalyst including the silica support are excellent.

More particularly, the support may be silica or silica-alumina, including a highly reactive siloxane group and dried at a high temperature through a method of drying at a high temperature, etc.

The support may further include an oxide, a carbonate, a sulfate, or a nitrate component such as $Na_2O$, $K_2CO_3$, $BaSO_4$ and $Mg(NO_3)_2$.

The polymerization reaction for polymerizing the olefin-based monomer may be achieved by a common process applied to the polymerization of an olefin monomer such as continuous solution polymerization, bulk polymerization, suspension polymerization, slurry polymerization and emulsion polymerization.

The polymerization reaction of the olefin-based monomer may be performed in an inert solvent, and as the inert solvent, benzene, toluene, xylene, cumene, heptane, cyclohexane, methylcyclohexane, methylcyclopentane, n-hexane, 1-hexene, and 1-octene may be used, without limitation.

The polymerization of the olefin-based polymer may be performed at a temperature of about 25° C. to about 500° C., particularly, at a temperature of 80° C. to 250° C., more preferably, 100° C. to 200° C. In addition, the reaction pressure during the polymerization may be 1 $kgf/cm^2$ to 150 $kgf/cm^2$, preferably, 1 $kgf/cm^2$ to 120 $kgf/cm^2$, more preferably, 5 $kgf/cm^2$ to 100 $kgf/cm^2$.

The olefin-based polymer of the present invention has improved physical properties, and accordingly, may be useful for hollow molding, extrusion molding or injecting molding in various fields and uses for packing, construction, household items, etc. including materials for cars, wires, toys, fibers, and medical, and particularly, useful for cars requiring excellent impact strength.

In addition, the olefin-based polymer of the present invention may be usefully used for the manufacture of a molded article.

The molded article may be a blow molding molded article, an inflation molded article, a cast molded article, an extrusion laminate molded article, an extrusion molded article, a foam molded article, an injection molded article, a sheet, a film, a fiber, a monofilament, a nonwoven fabric, etc.

Hereinafter, embodiments of the present invention will be explained in detail so that a person skilled in the art where the present invention belongs to could easily perform. However, the present invention may be accomplished in various different types and is not limited to the embodiments explained herein.

Preparation Example of Catalyst: Preparation of Transition Metal Compound

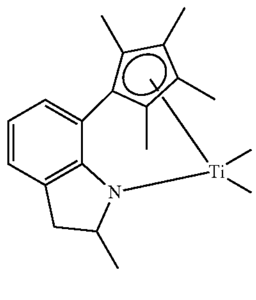

(1) Preparation of 2-methyl-7-(2,3,4,5-tetramethyl-1,3-cyclopentadienyl)indoline (i) Preparation of Lithium Carbamate 2-Methyl indoline (98.24 mmol) and diethyl ether (150 mL) were put in a Schlenk flask. Into a low-temperature bath of −78° C. obtained by dry ice and acetone, the Schlenk flask was immersed and stirred for 30 minutes. Then, n-BuLi (98.24 mmol) was injected under a nitrogen atmosphere via a syringe, and a light yellow slurry was formed. Then, the flask was stirred for 2 hours, and the temperature of the flask was elevated to room temperature while removing a butane gas produced. The flask was immersed into the low-temperature bath of −78° C. again to reduce the temperature, and a $CO_2$ gas was injected. According to the injection of the carbon dioxide gas, the slurry disappeared into a transparent solution. The flask was connected with a bubbler, and the temperature was elevated to room temperature while removing the carbon dioxide gas. After that, remaining $CO_2$ gas and solvents were removed under vacuum. After transporting the flask to a dry box, pentane was added thereto, followed by vigorous stirring and filtering to obtain lithium carbamate as a white solid compound. In the white solid compound, diethyl ether made a coordination bond.

(ii) Preparation of 2-methyl-7-(2,3,4,5-tetramethyl-1,3-cyclopentadienyl)indoline The lithium carbamate compound (2.60 mmol) prepared in step (i) above was put in a shlenk flask. Then, tetrahydrofuran (63.9 mmol) and 45 mL of diethyl ether were added thereto in order. Into a low-temperature bath of −20° C. obtained by acetone and a small amount of dry ice, the shlenk flask was immersed and stirred for 30 minutes, and n-BuLi (42.60 mmol) was injected. In this case, the color of the reaction mixture was changed into red. While continuously maintaining −20° C., stirring was performed for 6 hours. A $CeCl_3 \cdot 2LiCl$ solution (42.60 mmol) dissolved in tetrahydrofuran and tetramethylcyclopentanone (42.60 mmol) were mixed in a syringe and then injected into the flask under a nitrogen atmosphere. Slowly elevating the temperature of the flask to room temperature, a thermostat was removed after 1 hour, and the temperature was maintained to room temperature. Then, water (15 mL) was added to the flask, and ethyl acetate was put, followed by filtering to obtain a filtrate. The filtrate was transported to a separating funnel, and hydrochloric acid (2 N, 80 mL) was added thereto, followed by shaking for 12 minutes. Then, a saturated sodium bicarbonate aqueous solution (160 mL) was added to neutralize, and an organic layer was extracted. To the organic layer, anhydrous magnesium sulfate was put to remove moisture, and filtering was conducted. The filtrate was taken, and solvents were removed. The filtrate thus obtained was separated by a column chromatography method using a solvent of hexane and ethyl acetate (v/v, 10:1) to obtain a yellow oil. The yield was 19%.

$^1H$ NMR($C_6D_6$): δ 6.97(d, J=7.2 Hz, 1H, CH), δ 6.78(d, J=8 Hz, 1H, CH), δ 6.67(t, J=7.4 Hz, 1H, CH), δ 3.94(m, 1H, quinoline-CH), δ 3.51(br s, 1H, NH), δ 3.24-3.08(m, 2H, quinoline-$CH_2$, Cp-CH), δ 2.65(m, 1H, quinoline-$CH^2$), δ 1.89(s, 3H, Cp-$CH_3$), δ 1.84(s, 3H, Cp-$CH_3$), δ 1.82(s, 3H, Cp-$CH_3$), δ 1.13(d, J=6 Hz, 3H, quinoline-$CH_3$), δ 0.93(3H, Cp-$CH_3$) ppm.

(2) Preparation of [(2-methylindolin-7-yl)tetramethylcyclopentadienyl-eta5,kapa-N]titanium dimethyl (i) 2-Methyl-7-(2,3,4,5-tetramethyl-1,3-cyclopentadienyl)-indoline (2.25 g, 8.88 mmol) and 140 mL of diethyl ether were put in a round flask, the temperature was reduced to −30° C., and n-BuLi (17.6 mmol) was slowly added while stirring. The reaction was performed for 6 hours while elevating the temperature to room temperature. After that, washing with diethyl ether was conducted several times, and filtering was conducted to obtain a solid. Remaining solvents were removed by applying vacuum to obtain a dilithium salt compound coordinated with diethyl ether (compound 4 g) (1.37 g, 50%).

$^1H$ NMR(Pyridine-d8): δ 7.22(br s, 1H, CH), δ 7.18(d, J=6 Hz, 1H, CH), δ 6.32(t, 1H, CH), δ 4.61(brs, 1H, CH), δ 3.54(m, 1H, CH), δ 3.00(m, 1H, CH), δ 2.35-2.12(m,13H, CH, Cp-CH3), δ 1.39(d, indoline-CH3) ppm.

(ii) In a dry box, $TiCl_4$·DME (4.44 mmol) and diethyl ether (150 mL) were put in a round flask, and while stirring at −30° C., MeLi (8.88 mmol) was slowly added. After stirring for 15 minutes, the dilithium salt compound (1.37 g, 4.44 mmol) prepared in step (i) above was put in the flask. While elevating the temperature to room temperature, stirring was conducted for 3 hours. After finishing the reaction, vacuum was applied to remove solvents, and the resultant residue was dissolved in pentane and filtered, and the filtrate was taken. By removing pentane by applying vacuum, a titanium compound was prepared.

$^1H$ NMR($C_6D_6$): δ 7.01-6.96(m, 2H, CH), δ 6.82(t, J=7.4 Hz, 1H, CH), δ 4.96(m, 1H, CH), δ 2.88(m, 1H, CH), δ 2.40(m, 1H, CH), δ 2.02(s, 3H, Cp-$CH_3$), δ 2.01(s, 3H, Cp-$CH_3$), δ 1.70(s, 3H, Cp-$CH_3$), δ 1.69(s, 3H, Cp-$CH_3$), δ 1.65(d, J=6.4 Hz, 3H, indoline-$CH_3$), δ 0.71(d, J=10 Hz, 6H, $TiMe_2$-$CH_3$) ppm.

Examples and Comparative Examples: Preparation of Olefin-Based Polymer

Example 1

To a 1.5 L continuous process reactor, a hexane solvent (7 kg/h) and 1-butene (0.29 kg/h) were charged, and the temperature of the top of the reactor was pre-heated to 139.2° C. A triisobutylaluminum compound (TiBAl, 0.03 mmol/min), the transition metal compound (0.28 μmol/min) obtained in the Preparation Example, and a dimethylanilinium tetrakis(pentafluorophenyl) borate co-catalyst (0.87 μmol/min) were injected at the same time into the reactor. Then, a hydrogen gas (33 cc/min) and ethylene (0.87 kg/h) were injected into the reactor, and copolymerization reaction was performed by maintaining 139.2° C. for 30 minutes or more in a continuous process with a pressure of 89 bar to obtain a copolymer. After drying in a vacuum oven for 12 hours or more, physical properties were measured.

Examples 2 to 5

Copolymers were obtained by performing the same copolymerization reaction as in Example 1 except for changing the preparation conditions as in Table 1 below.

Comparative Example 1

DF840 of Mitsui Chemicals Inc. was purchased and used.

Comparative Example 2

DF810 of Mitsui Chemicals Inc. was purchased and used.

Comparative Example 3

Copolymers were obtained by performing the same copolymerization reaction as in Example 1 except for changing the preparation conditions as in Table 1 below.

TABLE 1

| | Catalyst (μmol/min) | Co-catalyst (μmol/min) | TiBAl (mmol/min) | Ethylene (kg/h) | Hexane (kg/h) | 1-Butene (kg/h) | Hydrogen (cc/min) | Reaction temp (° C.) |
|---|---|---|---|---|---|---|---|---|
| Example 1 | 0.28 | 0.87 | 0.03 | 0.87 | 7 | 0.29 | 33 | 139.2 |
| Example 2 | 0.28 | 0.87 | 0.03 | 0.87 | 7 | 0.28 | 33 | 138.5 |
| Example 3 | 0.29 | 0.87 | 0.03 | 0.87 | 7 | 0.29 | 33 | 140.2 |
| Example 4 | 0.20 | 0.60 | 0.03 | 0.87 | 7 | 0.37 | 31 | 139.3 |
| Example 5 | 0.20 | 0.60 | 0.03 | 0.87 | 7 | 0.35 | 31 | 139.0 |
| Comparative Example 3 | 1.40 | 4.20 | 0.03 | 0.87 | 7 | 0.84 | 0 | 171.0 |

Experimental Example 1: Analysis of Olefin-Based Polymer

With respect to the copolymers of the Examples and the Comparative Examples, physical properties were evaluated according to the methods below and are shown in Table 2 below.

(1) Density

Measurement was conducted according to ASTM D-792.

(2) Melt Index (MI)

Measurement was conducted according to ASTM D-1238 (condition E, 190° C., 2.16 kg load).

(3) Melt Flow Rate Ratio (MFRR, $MI_{10}/MI_{2.16}$)

According to ASTM D-1238 [condition E, $MI_{10}$ (190° C., 10 kg load), $MI_{2.16}$ (190° C., 2.16 kg load)], $MI_{10}$ and $MI_{2.16}$ were measured, and $MI_{10}$ was divided by $MI_{2.16}$ to calculate the melt flow rate ratio.

(4) Weight Average Molecular Weight (Mw, g/mol) and Molecular Weight Distribution (MWD)

A number average molecular weight (Mn) and a weight average molecular weight (Mw) were measured respectively, using gel permeation chromatography (GPC), and molecular weight distribution was calculated through dividing the weight average molecular weight by the number average molecular weight.

Column: PL Olexis

Solvent: trichlorobenzene (TCB)

Flow rate: 1.0 ml/min

Specimen concentration: 1.0 mg/ml

Injection amount: 200 μl

Column temperature: 160° C.

Detector: Agilent High Temperature RI detector

Standard: Polystyrene (calibrated by cubic function)

(5) Melting Temperature (Tm) and Glass Transition Temperature (Tg)

The melting temperature was obtained using a differential scanning calorimeter (DSC: differential scanning calorimeter 250) manufactured by TA instrument Co. That is, the temperature was elevated to 150° C., kept for 1 minute, and reduced to −100° C., and then, the temperature was elevated again. The DSC curve was observed.

(6) P(50), P(70), and Elution Temperature (Te)

CFC of PolymerChar Co. was used as a measurement apparatus. First, the polymer solution was completely dissolved using o-dichlorobenzene as a solvent at 130° C. for 60 minutes in an oven in a CFC analyzer, and then the solution was introduced into a TREF column controlled to 130° C. Then, the column was cooled to 95° C. and stabilized for 45 minutes. Then, the temperature of the TREF column was decreased to −20° C. in a rate of 0.5° C./min, and was kept at −20° C. for 10 minutes. After that, an elution amount (mass %) was measured using an infrared spectrophotometer. Then, the temperature of the TREF column was increased in a rate of 20° C./min to a preset temperature and at the reached temperature, the temperature was maintained for a preset time (that is, about 27 minutes), and this work was repeated until the temperature of the TREF reached 130° C., and the amount (mass %) of an eluted fraction in each temperature range was measured. In addition, a weight average molecular weight (Mw) was measured by the same measurement principle of GPC except for sending the eluted fraction at each temperature to a GPC column and using o-dichlorobenzene as a solvent.

A temperature-elution amount graph was made and integrated, and the total elution amount was standardized to 100%. The elution amount (wt %) eluted at −20 to 50° C. was defined as P(50), and the elution amount (wt %) eluted at −20 to 75° C. was defined as P(75).

In addition, the elution temperature (Te) means a temperature corresponding to the apex among peaks present after −20° C. on the graph.

(7) Soluble Fraction

The soluble fraction (SF) content means the amount of a fraction eluted at −20° C. or less and was measured using CFC.

Experimental Example 2: Evaluation of Olefin-Based Polymer

With respect to the olefin-based polymers of the Examples and Comparative Examples, physical properties were measured according to the methods below.

(1) Tensile Strength and Elongation

The copolymers were extruded to manufacture pellet shapes, and tensile strength when broken and elongation were measured according to ASTM D638 (50 mm/min).

(2) Tear Strength

The copolymers were extruded to manufacture pellet shapes, and tear strength when broken was measured according to D624 (Type C).

(3) Flexural Modulus

Measurement was conducted using INSTRON 3365 apparatus according to ASTM D790.

(4) Hardness (Shore A)

Hardness was measured according to the standard of ASTM D2240 using GC610 STAND for durometer of TECLOCK Co. and a shore durometer Type A of Mitutoyo Co.

TABLE 3

| | Tensile strength (Mpa) | Elongation (%) | Tear strength (kN/m) | Flexural modulus (Mpa) | Hardness (Shore A) |
|---|---|---|---|---|---|
| Example 1 | 32.2 | >700 | 65.7 | 34.43 | 96.7 |
| Example 2 | 28.9 | >700 | 66.5 | 34.63 | 87.3 |
| Example 3 | 26.8 | >700 | 66.8 | 36.98 | 88.2 |
| Example 4 | 17.1 | >800 | 68.5 | 32.26 | 86.9 |
| Example 5 | 18.1 | >700 | 70.8 | 34.26 | 92.9 |
| Comparative Example 1 | 25.1 | >700 | 63.17 | 30.37 | 85.8 |
| Comparative Example 2 | 15.0 | >700 | 68.31 | 27.91 | 85.3 |
| Comparative Example 3 | 8.1 | >700 | 43.0 | 17.0 | 74.0 |

As in the results above, it was confirmed that the olefin-based polymers of the Examples showed increased mechanical rigidity when compared to the Comparative Examples,

TABLE 2

| | Density g/mL | MI g/10 min | Te ° C. | P (50) | P (75) | P (75) − P (50) | MFRR | Tm ° C. | Tg ° C. | Mw g/mol | MWD | SF |
|---|---|---|---|---|---|---|---|---|---|---|---|---|
| Example 1 | 0.8840 | 1.14 | 36.5 | 90.6 | 99.1 | 8.5 | 6.76 | 63.6 | −44.2 | 114,315 | 2.09 | 0.4 |
| Example 2 | 0.8850 | 0.97 | 36.4 | 90.2 | 99.1 | 8.9 | 6.96 | 65.8 | −44.7 | 115,490 | 2.08 | 0.3 |
| Example 3 | 0.8850 | 1.16 | 35.5 | 90.4 | 99.1 | 8.7 | 6.53 | 70.6 | −43.1 | 108,628 | 2.03 | 0.3 |
| Example 4 | 0.8860 | 3.39 | 33.5 | 89.6 | 98.6 | 9.0 | 6.62 | 64.3 | −44.9 | 83,659 | 2.05 | 0.4 |
| Example 5 | 0.8880 | 3.21 | 35.7 | 89.7 | 98.7 | 9.1 | 6.48 | 71.1 | −44.8 | 86,057 | 2.10 | 0.4 |
| Comparative Example 1 | 0.8840 | 1.18 | 39.5 | 99.8 | 100.0 | 0.2 | 6.51 | 69.3 | −43.3 | 114,216 | 1.90 | 4.7 |
| Comparative Example 2 | 0.8840 | 3.44 | 38.2 | 99.8 | 100.0 | 0.2 | 6.31 | 70.9 | −42.9 | 83,425 | 1.93 | 1.3 |
| Comparative Example 3 | 0.8771 | 3.38 | 28.3 | 26.5 | 33.5 | 7.0 | 8.34 | 62.8 | −48.4 | 83,221 | 2.38 | 2.1 |

As shown in Table 2, the olefin-based copolymers according to the Examples satisfied the conditions (1) to (4), defined in the present invention, but the Comparative Examples did not satisfy the conditions, and particularly, it was confirmed that a value of P(75)−P(50) was very small and less than 8.0.

and showed improved tensile strength, tear strength, flexural modulus, hardness, or the like.

The invention claimed is:

1. An olefin-based polymer satisfying the following conditions (1) to (4):

(1) a melt index (190° C., 2.16 kg load conditions) is from 0.1 to 10.0 g/10 min, (2) a density is from 0.875 to 0.895 g/cc, (3) an elution temperature (Te) measured by cross-fractionation chromatography (CFC) is from 30 to 40° C., and (4) 8.0≤P (75)−P (50)≤12.0 is satisfied when measuring CFC, wherein P (75) and P (50) are an elution amount (wt %) in a temperature range of −20 to 75° C., and an elution amount (wt %) in a temperature range of −20 to 50° C., respectively, on a temperature-elution amount graph measured by CFC.

2. The olefin-based polymer according to claim 1, further satisfying the following condition (5):

(5) a melt flow rate ratio ($MI_{10}/MI_{2.16}$) is from 5 to 10.

3. The olefin-based polymer according to claim 1, further satisfying the following condition (6):

(6) a melting temperature (Tm) measured by differential scanning calorimetry (DSC) is from 55 to 90° C.

4. The olefin-based polymer according to claim 1, further satisfying the following condition (7):

(7) a glass transition temperature (Tg) measured by differential scanning calorimetry (DSC) is from −70 to −30° C.

5. The olefin-based polymer according to claim 1, further satisfying the following condition (8):

(8) a weight average molecular weight is from 10,000 to 500,000 g/mol.

6. The olefin-based polymer according to claim 1, further satisfying the following condition (9):

(9) a molecular weight distribution (MWD) is from 0.1 to 6.0.

7. The olefin-based polymer according to claim 1, further satisfying the following condition (10):

(10) a soluble fraction (SF) at −20° C. when measuring cross-fractionation chromatography (CFC) is 2 wt % or less.

8. The olefin-based polymer according to claim 1, wherein the olefin-based polymer is a copolymer of ethylene and an alpha-olefin comonomer of 3 to 12 carbon atoms.

9. The olefin-based polymer according to claim 8, wherein the alpha-olefin comonomer is one or more selected from the group consisting of propylene, 1-butene, 1-pentene, 4-methyl-1-pentene, 1-hexene, 1-heptene, 1-octene, 1-decene, 1-undecene, and 1-dodecene.

10. The olefin-based polymer according to claim 8, wherein the olefin-based polymer is a copolymer of ethylene and 1-butene.

11. The olefin-based polymer according to claim 8, wherein the alpha-olefin comonomer is included in an amount of 90 wt % or less based on the total weight of the copolymer.

12. The olefin-based polymer according to claim 1, wherein the olefin-based polymer is prepared by polymerizing an olefin-based monomer by injecting a hydrogen gas at 20 to 100 cc/min in the presence of a catalyst composition comprising a transition metal compound of Formula 1:

[Formula 1]

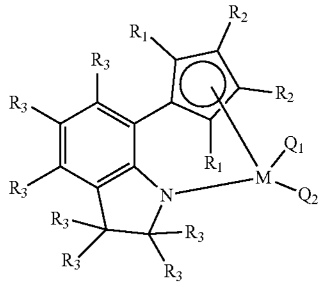

in Formula 1, $R_1$ groups are the same or different and each independently hydrogen, alkyl of 1 to 20 carbon atoms, alkenyl of 2 to 20 carbon atoms, aryl, silyl, alkylaryl, arylalkyl, or metalloid radical of a metal in group 4, which is substituted with hydrocarbyl;

$R_2$ groups are the same or different and each independently hydrogen, halogen, alkyl of 1 to 20 carbon atoms, aryl, alkoxy, aryl oxy, or amido, and two or more among $R_2$ groups are optionally connected with each other to form an aliphatic ring or an aromatic ring;

$R_3$ groups are the same or different and each independently hydrogen, halogen, alkyl of 1 to 20 carbon atoms, alkenyl of 2 to 20 carbon atoms, aryl, alkylaryl, arylalkyl, alkoxy of 1 to 20 carbon atoms, aryloxy, or amido, and two or more $R_3$ groups are optionally connected with each other to form an aliphatic or aromatic ring;

M is a transition metal in group 4; and $Q_1$ and $Q_2$ are each independently halogen, alkyl of 1 to 20 carbon atoms, alkenyl, aryl, alkylaryl, arylalkyl, alkyl amido of 1 to 20 carbon atoms, or aryl amido.

13. The olefin-based polymer according to claim 12, wherein the catalyst composition comprises a transition metal compound of Formula 1-1:

[Formula 1-1]

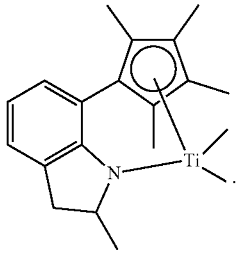

* * * * *